(12) United States Patent
McGovern et al.

(10) Patent No.: US 6,189,001 B1
(45) Date of Patent: Feb. 13, 2001

(54) TAPE SYSTEM STORAGE AND RETRIEVAL PROCESS

(75) Inventors: Thomas Charles McGovern; Geraint Waters; William Shaughnessy, all of Dublin (IE)

(73) Assignee: Dascom Software Development Services Limited, Leixlip (IE)

( * ) Notice: Under 35 U.S.C. 154(b), the term of this patent shall be extended for 0 days.

(21) Appl. No.: 09/163,440

(22) Filed: Sep. 30, 1998

(51) Int. Cl.[7] .................................................. G06F 17/30
(52) U.S. Cl. .............................. 707/1; 707/10; 707/100; 707/103; 707/205; 709/104
(58) Field of Search ................................. 707/1, 10, 100, 707/103, 205; 709/104

(56) References Cited

U.S. PATENT DOCUMENTS

| | | | |
|---|---|---|---|
| 5,226,176 | * | 7/1993 | Westaway et al. ...................... 707/2 |
| 5,608,865 | * | 3/1997 | Midgely et al. ......................... 714/1 |
| 5,778,394 | * | 7/1998 | Galtzur et al. ........................ 707/205 |
| 5,911,150 | * | 6/1999 | Peterson et al. ...................... 711/162 |
| 5,926,822 | * | 7/1999 | Garman ................................ 707/503 |
| 5,950,218 | * | 9/1999 | Howard ................................... 711/4 |

FOREIGN PATENT DOCUMENTS 2285525    7/1995   (GB) .

* cited by examiner

Primary Examiner—John Breene
Assistant Examiner—Cheryl Lewis
(74) Attorney, Agent, or Firm—Jacobson, Price, Holman & Stern, PLLC

(57) ABSTRACT

A tape storage and retrieval system is provided to facilitate the archival of machine data to tape and optionally to disk storage in a manner which enables the retrieval of the data in a batch or on-line processing environment. A hierarchy of storage levels is adopted for data objects within the system. The manner of the storage of the data object within the tape system is determined by the storage level which is changed over time to reflect the need for access to the data object. For example, those tapes storing data object allocated the highest level of storage may be stored in parallel on disks, may only be written so as to occupy only part of the tape volume, or stored on the tape system drive.

25 Claims, 2 Drawing Sheets

TAPE SYSTEM STORAGE AND RETRIEVAL PROCESS

BACKGROUND OF THE INVENTION

1. Field of the Invention

The field of the present invention relates to a process for the storage and retrieval of data on a tape system.

2. Description of the Prior Art

Such tape systems generally comprise a tape drive with on-line storage and retrieval and off-line retrieval. Such a system is described in our U.K. Patent No. 2,285,525, which describes the process being carried out by a database controller, a data processor and a tape system controller. Essentially in this system there is set up a database structure including a single volume-type dataset for a plurality of data objects containing one or more variable length logical records. When a data storage request is received from a data processor it carries out the steps of assigning a single tape volume to the relevant dataset, directing creation of a new record header within a data block of the tape volume; the header including a primary key and a storage date and writing the data to a plurality of sub-records in sequence after the record header. Finally it sets up an index file for the database comprising a single index control record with tape system initialisation data.

This system has been extremely successful in that it allows for the retrieval of data from tapes which appears to be at least to the user an "on-line" system. The invention of this U.K. Patent Specification No. 2,285,525 enabled the use of tape storage systems for what are effectively on-line processing situations. However, since this invention was first introduced into the market place there has been an enormous, indeed an exponential, increase in the amount of data that is now being stored in database systems. The need to facilitate the archival of inactive data-to-tape storage and to enable the retrieval of this archived data in a batch or on-line processing environment has increased enormously. For many reasons the amount of data now being archived is increasing enormously and at the same time the need for increased and efficient retrieval of that data is becoming more urgent. The problem is that there is a need to have archived database material processed so that it appears to be fully integrated into existing or planned batch or on-line applications.

With the increased volume of data being stored, it is becoming more and more difficult to achieve an apparent on-line processing environment than heretofore.

As has already been described in U.K. Patent Specification No. 2,285,525, data is held in accordance with the present invention as a series of objects which may consist of one or more variable-length logical records, each record containing up to 32,760 bytes in one particular system. There is no limit to the number of logical records in each object. During the data archival procedure, each logical record within an object is passed sequentially for insertion into the database and during object retrieval each of its component logical records will be separately identified to the retrieval batch or on-line application. This has been achieved by ensuring that an object is identified by an unique combination of primary key and archived data. Multiple objects with the same primary key may exist in the database, but the archive date for each of these objects will be different. Further in accordance with the invention as previously described an object may be indexed by one or more secondary keys using a secondary indexing facility. These are created when an object is written to the database. The primary index entry is always created and secondary index entries are generated depending on what is required, either because it is automatically generated or by explicit request on archiving.

In essence the database consists of various components namely one or more single volume tape datasets containing archived objects, a primary index dataset, space management dataset and journal dataset if an audit trail is required and various back-up or secondary datasets.

Because of the enormous increase in the amount of information being stored and also because of the greatly increased volume of data that can now be stored on the one tape contained in a tape cartridge, there is a need for an improved management of the data on the tape to optimise access to the data. The problem is that as the number of silos for storing tapes off-line increases, the recycling time is taking even longer than heretofore. This is in spite of increased and more efficient tape handling facilities.

Recently there have been developments in the storage and retrieval of data on a tape system. The first development has been that more and more the service is being provided by a host database system or a number of clients. Alternatively, if the host database system is not being operated for a number of clients and indeed it is being operated by the one company for the one organisation, there are often what are in effect a number of clients within the organisation. For example, queries from portions of the organisation answering customer queries should be dealt with more quickly than requests for information for internal purposes. Thus, in effect, each organisation consists of a number of clients with different needs and indeed for the people operating the tape system with different priorities allocated to their needs. Further, when clients of a host tape system are themselves making requests to the host tape system it is necessary for them to schedule and prioritise their own internal requests. This problem has been exacerbated by what can only be described as the explosion of Windows NT or OS/2 workstations within organisations. There is thus a need for the tape system to be able to service requests from other applications running on workstations for access and retrieval of data archived in the tape system. For example, it is possible that multiple clients may be concurrently connected to the same tape system and they in turn may execute request on different client workstations, so that in turn at the host end it is important to be able to handle the multiple requests from each connected client.

The term 'storage level' is used to refer to the priority of storage for the particular data object. For example, the highest level of storage or the highest storage level will be allocated to those data objects that are likely to require retrieval on a regular basis that is to say having the highest level of activity. The storage level of a data object will, very often, be determined either by, for example, a particular customer, the nature of the data, or indeed, commonly the time for which the information has been stored.

BACKGROUND OF THE INVENTION

The present invention is directed towards providing an improved process for the storage and retrieval of data on a tape system, which includes a tape drive, on-line tape storage and off-line retrieval as hereinbefore described.

It is a further object of the present invention to provide a tape system that will take cognisance of the need for retrieval of a particular object namely the level of activity of the request for retrieval of that object.

Further the invention is directed towards providing a system where objects requiring the greatest level of activity will be retrieved in the most efficient manner and in the least possible time, thus in effect mirroring an on-line system. The invention is thus directed to providing an improved management of the data on the tape to optimise access to data on a tape system.

It is a further object of the present invention to provide a system that will service data requests in the most efficient manner possible, whether they be in-house requests, or by a host server, where in effect the host tape system serves a plurality of clients.

SUMMARY OF THE INVENTION

According to the invention there is provided a process for the storage and retrieval of data on a tape system including a tape drive with on-line tape storage and off-line retrieval, the process being carried out by a database controller, a data processor and a tape system controller, the process comprising the steps of:

setting up a database structure including a single volume type dataset for a plurality of data objects containing one or more variable length logical records;

creating a hierarchy of storage levels based on perceived levels of activity for data objects written to the database to provide separate specific storage levels;

allocating a tape to a specific storage level;

allocating an appropriate proportion of the storage capacity of that tape for storage of objects at that specific storage level; and setting up an index file for the database comprising a single index control record with tape system initialisation data for each object;

on receiving an object storage request for the system carrying out the steps of:

allocating a storage level to the object;

assigning the object to an appropriate tape for that storage level;

creating a new record header within the tape for that object, the header including a primary key, a storage date and at least storage level information;

writing the object to the tape in sequence after the record header;

entering the record header and associated tape position information on the index file;

over time re-assessing the storage level assigned to the object;

allocating a new storage level to the object as a result of a re-assessment;

altering the record header for the object within the tape and the index file to reflect the new storage level; and having the tape system controller handle the object in the appropriate manner within the tape system for that storage level; and on receiving a data retrieval request carrying out the steps of:

addressing the index files with the primary key and the storage date and accessing the relevant tape and tape position information; and transmitting read instructions to the tape system.

The great advantage of this is that one can have the tapes in the best positions for retrieval, or one can store data on the tapes in the best way for subsequent retrieval.

In one embodiment of the invention at regular time intervals, the following steps are performed of:

scanning all the tapes storing objects allocated a specific storage level;

allocating a different storage level to all objects stored greater than a predetermined length of time at the specific storage level; and performing the required operations on each of the objects allocated the different storage levels as appropriate to that storage levels.

The advantage of this is that one can always ensure that the most recently stored data is at the highest storage level.

One possible way in which the storage levels can be changed is carried out in accordance with the present invention by carrying out the following steps of:

recording the level of activity of an object within the database;

at regular time intervals scanning all the tapes storing objects allocated a specific storage level;

allocating a different storage level to all objects stored, whose activity since last scanned fall below a predetermined level of activity; and performing the required operations on each of the objects allocated the different level as is appropriate to that storage level.

The particular advantage of this is that one can ensure that the specific storage level is most suitable to the activity.

In a still further embodiment of the invention, in which when a different storage level is allocated to the object the tape system controller carries out the steps of:

re-writing the object to a tape allocated to the new storage level; and deleting the object from the tape storing data at the former level of storage.

Preferably when the amount of data stored on a tape falls below a pre-set amount for that tape, the steps are performed on the remaining objects stored on the tape of:

rewriting the remaining objects to another tape allocated to that specific storage level for those objects being rewritten;

deleting the objects from the original tape; and releasing the original tape for re-use of the tape system.

The advantage of this is that one doesn't have a considerable amount of information on tapes that is redundant, nor indeed when a tape is storing a small amount of information does it remain within the system, but is recycled for re-use.

In a particularly suitable process according to the invention, when an object is allocated the highest level of storage the steps are performed of:

simultaneously writing the object to disk and tape to form a parallel level of storage;

writing disk storage information to the record header and thus on the index file to provide primary access on the disk for the object on receiving a data retrieval request;

storing the tapes off-line; and on allocating a new lower storage level to the object as a result of re-assessment, the steps are performed of:

deleting the data from the disk; and having the tape system controller handle the object and its tape in the appropriate manner within the tape system for that new storage level.

It will be appreciated that there is a considerable advantage in using a disk in combination with tape storage and the great advantage of writing the object to tape is that even if the disk should get corrupted, the data is still available.

Preferably when an object is allocated a sufficiently high storage level the tape on which it is written is contained on the system drive and in which the tape may be regularly scanned for an object which should be rewritten to a lower level of storage and in which optionally when a lower level of storage is deemed appropriate, there is performed the steps of:

rewriting the object to a tape allocated to the new lower storage level;

deleting the object from the tape contained on the system drive;

scanning the latter tape to determine whether the amount of data falls below the pre-set amount for that tape; and in which if necessary the steps are performed of:

rewriting the remaining objects to a new tape;

inserting that new tape into the tape drive; and releasing the original tape from the tape drive for re-use in the tape system.

The more tapes that can be held on the system tape drive the better, as long as there are not so many as to cause excessive "dismount prior to mount" activity and for this reason it is important that the steps are performed of:

recording the number of times a request for any object on tape is received requiring its loading on a tape drive;

comparing this to the number of requests for objects on other tapes; and retaining the most frequently accessed tapes on the tape drive.

In one particularly useful embodiment of the invention, the process includes a process for servicing data supply requests from a client to obtain data from a supplier's host data storage and retrieval tape system comprising the steps of:

transmitting the request from a client input device to a client interface to determine the validity of the request and the request is accepted or rejected;

storing a valid request as a client request queue on a client task scheduler;

transmitting requests to a client/host interface to determine the validity of the request in accordance with host acceptance rules and the request is accepted or rejected;

transmitting a valid request to a host task scheduler where a valid request is accepted for processing or rejected;

entering an accepted request into a database queue within the database controller;

taking the request from the database queue;

addressing the index file with the primary key and the storage date and accessing the relevant tape and tape position information;

transmitting read instructions to the tape system controller;

sending the data object to the host task transmitter;

transmitting the requested data object to the client host interface;

transmitting the requested data object to the client input device; and removing the request from the client request queue.

In this latter embodiment the request is preferably sent to the client input device through the client interface. It may indeed be sent to a received data request storage file under client control for subsequent access.

In one embodiment of the invention on being downloaded from the request storage file, the data is deleted from the request storage file.

Ideally after a pre-set time the data is deleted from the storage file.

In the client scheduler, the steps are preferably performed of:

examining the valid request and assigning a priority to the request; and assigning a place in the client request queue depending on the urgency of the request.

It is also envisaged that the client scheduler may store a plurality of valid requests in batches for subsequent transmittal to the host data storage and retrieval system.

These interfaces allow use of PCs in clients' operations to obtain the same level of response as if they were all directly connected to the host computer.

BRIEF DESCRIPTION OF THE DRAWINGS

The invention will be more clearly understood from the following description of some preferred embodiments of the invention given by way of example only with reference to the accompanying drawings in which.

DETAILED DESCRIPTION OF THE INVENTION

Figure 1:
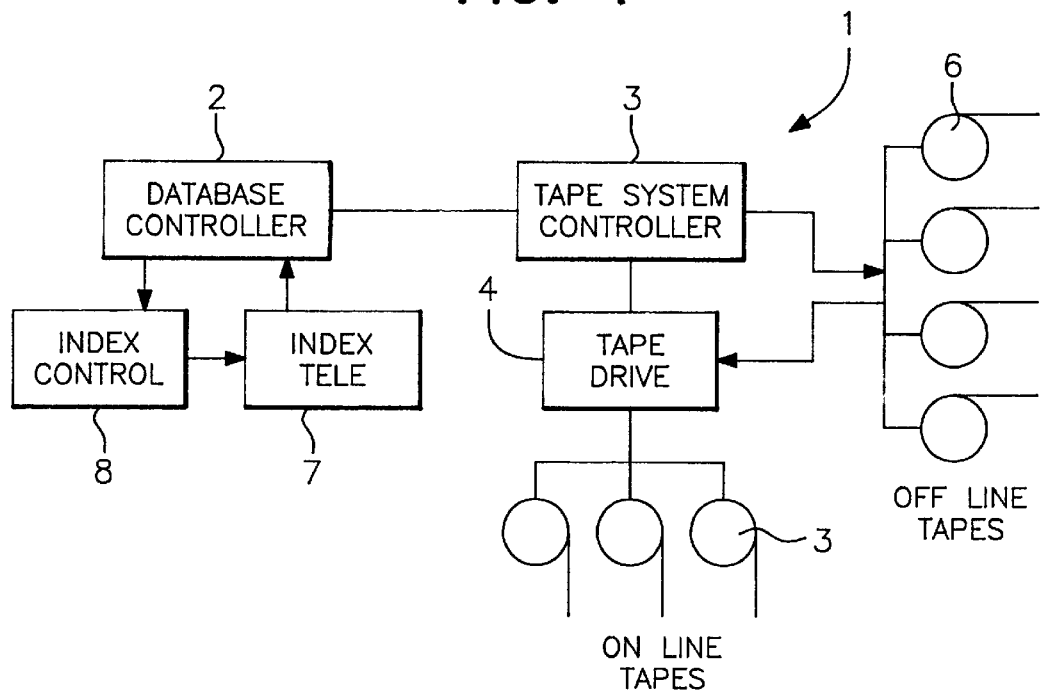
FIG. 1 is a block diagram showing a processing system according to the invention.

Referring to the drawings and initially to FIG. 1, there is illustrated a data processing system indicated generally by the reference numeral 1 having a database controller 2, which essentially controls a database which in turn feeds to a tape system controller 3 for a tape system which incorporates a tape drive 4 having on-line tapes 5 and off-line tapes 6, all of conventional construction. The database controller 2 has an index file 7 as described in U.K. Patent Specification No. 2,285,525 and an index control 8 which contains all the necessary initialisation data for the database control so as to allow the database to operate in the most efficient manner possible. Again all of this is substantially as described in U.K. Patent Specification No. 2,285,525 and is therefore not described in any great detail. The essential element of the present invention is the creation of a hierarchy of storage levels for the tape system based on perceived levels of activity for data objects written within the database to provide separate specific storage levels. Having regard to this storage level the data is then written in various ways to the database on the basis of the perceived storage level.

Various situations arise, for simplicity, they can be summarised as follows:

Situation No. 1—Two levels of storage for data all stored on tape off-line.

Situation No. 2—Two levels of storage for data, the first level is stored on-line on tape and the second level off-line.

Situation No. 3—Some storage on-line, the rest of the highest level of storage stored off-line and the second level of storage stored off-line.

Situation No. 4—Some storage on disk and then the remainder on tape, this is described hereinafter with reference to FIG. 2.

Situation No. 5—Additional storage levels in excess of two.

It will be appreciated there are many variations of situations, however, the above are the most common situations with the present invention.

As well as providing different storage levels for data objects, it is also necessary to determine the appropriate storage level. Accordingly, it is necessary to either determine the storage level on input by either the person making the request for storage, or by general rules of storage in an index control file. For example, one can well see that when for a financial institution such as a retail bank the system receives a request to copy to archive bank cheques that they would be archived at the lowest level of storage, while customer account statements would be archived at a higher level of storage. Alternatively, the storage level can be determined by use by activity as will be described hereinafter, or simply on a time basis, allocating the highest level of storage to an object being archived on its receipt and subsequently after pre-set period of time migrating the object to a lower level of storage. Thus, the level of storage can be changed over time, or by use.

As will be described hereinafter, depending on the manner in which the data objects are stored on tape, it will be necessary to in many instances delete data objects from one tape and re-write the data onto another tape, thus there will be gaps in tapes without any data written thereon and therefore increased tape management is required.

Many ways for allocating a storage level to a data object may be used. In its simplest, the database controller simply allocates the highest level of storage to each data object of an archive request on first receiving the request. Alternatively as can be readily achieved and doesn't require any further explanation, the index control can identify the type of information being archived by virtue of the header information inputted to it to allocate the desired storage level. As explained above, one can well appreciate that certain information would require a lower storage level than other information, even from its initial storage on the tape system.

Then it becomes a question of re-assessing the storage level assigned to the object so that the objects are not stored in the highest level of storage after that time when they are unlikely to be requested, except very rarely. Ideally over time the storage level assigned to each object is accessed on a regular basis and a new storage level is allocated to the object as a result of this re-assessment. The re-assessment could simply be by virtue of time, namely that the object is being stored for example, for 3 months at the highest level of storage, or, alternatively, it could be by assessing the number of times since last assessed that the object had been retrieved.

When it is desired to change the storage level the record header for the object within the tape has to be altered and the index file altered similarly to reflect the new storage level. When, in this embodiment, the data object is being transferred from the first level of storage to the next level of storage, the object is now re-written in conventional manner as described in U.K. Patent Specification No. 2,285,525 to another tape, which other tape has been allocated to the second level of storage. The object is then deleted from the original or first tape.

Referring initially to the first situation where it is decided to have two levels of storage, namely a first level and a secondary level, there is allocated certain tapes for the first level of storage and only half of the capacity of the tape is available for writing on at the first level of storage. Then in accordance with normal practice there is created a new record header within the tape for that object, the header including a primary key, a storage data and a secondary key including at least storage level information. The object is then written to the tape in sequence after the record header and associated tape position information is entered onto the index file by the database controller. Since there is only half of the tape being used, when it is desired to access the tape, which will be off-line, the tape will be delivered to the tape drive and in the tape drive can be more quickly accessed than if the full tape had data written thereon.

Preferably in this embodiment all the tapes carrying data at the first level of storage are scanned on a regular basis to identify the capacity of the tape that is being used for storage. When the capacity of the tape being used for storage falls below 40%, or indeed whatever percentage is set, the remaining objects on that tape are then written to another tape allocated to that specific storage level, in this case the first storage level. When the objects have been re-written they are deleted from the original tape and the original tape is then released for re-use in the tape system. In this way there is not left a large number of effectively redundant tapes in use for the highest level of storage.

In the second situation according to the invention, when a data object is assigned the highest level of storage, the tape to which it is assigned is held on-line in the tape drive. When this happens, the tape is fully written on and it is re-assessed from time to time to make sure that there is not more than a certain percentage, possibly of the order of 20%, redundant spaces therein due to data objects having been re-written to other tapes.

It will generally be appreciated that objects will usually be automatically migrated between storage levels using an age basis.

It will also be appreciated that in all cases the database may define a finite length of time for retention of an object on the database, when it will be automatically deleted.

It will be appreciated that a mixture of the systems used in the first two situations described above, may be used for the more efficient management of the data. For example, while the tapes may not be held permanently on line, the tape system controller can be so programmed as to ensure that those tapes most commonly accessed are held on-line.

Figure 2:
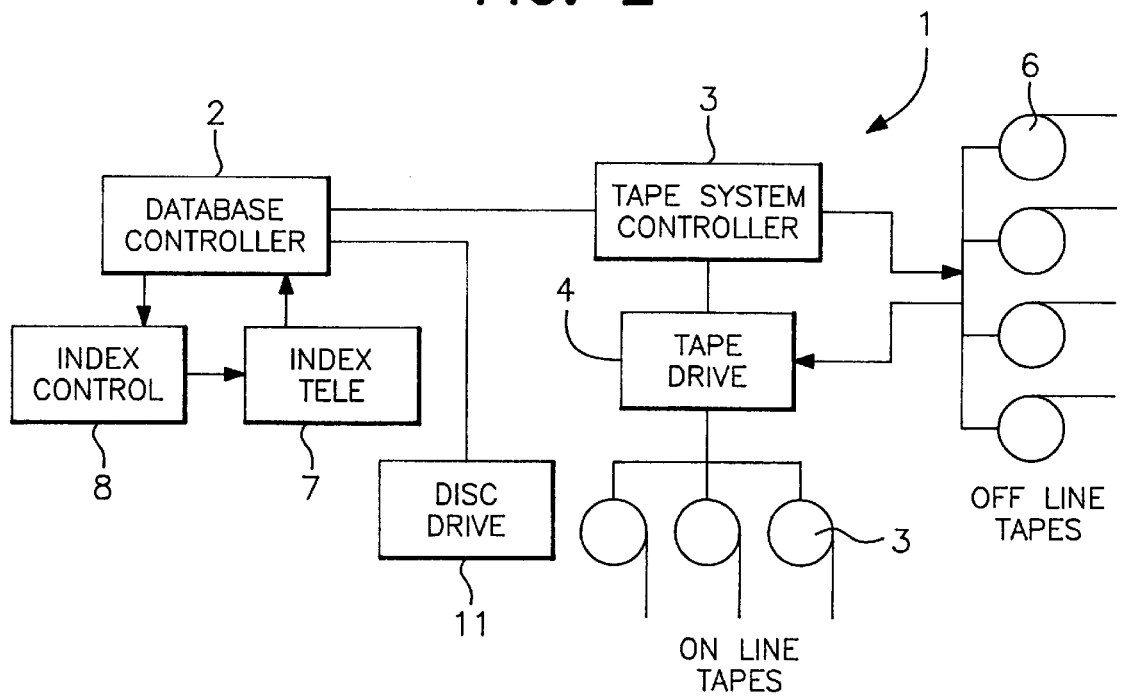
FIG. 2 is a block diagram showing a further processing system according to the invention.

Referring now to FIG. 2 there is illustrated a data processing system indicated generally by the reference numeral 10 having essentially the same components as that of the database system 1 and similar parts are identified by the same reference numerals. In this embodiment there is provided a disk drive 11 connected to the database controller and the database system.

In this embodiment when a data object is allocated the highest level of storage it is written to the disk drive 11 and to a tape simultaneously. The tape to which the data object is written is maintained as an off-line tape 6. Thus, it is possible with a disk drive to have some tapes in a second level of storage maintained on-line, or some tapes in the second level of storage with only half the tape capacity used, or indeed any variation in the situations already described. Obviously because this storage on disk is much more efficient and easier to access, when the database controller receives a request for a data object and the data object is storage on the disk drive, then the disk drive will be accessed.

Usually after a period of time, the data object will be deleted from the disk drive and the necessary header information etc. entered on the index file. When data is deleted from the disk drive, the data may need to be re-written from the tape on which it was originally stored.

In all the embodiments described above, reference has been made to two levels of storage, but it will be appreciated that many more levels of storage could be achieved. For example, a third level of storage might refer to tapes which are not alone stored offline, but are not even stored off-line with an automated tape processing handling system. For example, tapes could be stored totally off-line so that they could only be archived by manually retrieving a tape and placing it in a silo, or onto the tape drive.

For example with this storage, it may be possible to use a system according to the present invention without any specific requirement for support of automated tape processing.

It will be appreciated that the present invention optimises the performance of data retrieval. For example in general reducing the amount of data held per tape volume will reduce the average time to locate an object and consequently reduce the average response time for on-line data retrieval. However, the number of tape library storage cells required to contain whole volumes of such a database will increase proportionately.

Obviously the more tape drives that can be allocated to the system will improve the throughput for on-line tape retrieval operations and reduce the likelihood of an "archiving busy" condition being raised in response to a retrieval request. All archival requests would be satisfied by retrieving data from the specific tape cartridge volume. However, due to the nature of tape processing, multiple concurrent requests for retrieval from a tape cartridge volume must be processed serially. Thus, if a volume is being processed by another user, a second request will be queued within the system. In this case, the second request will be delayed when the first request is being processed and then will be subject to another delay while the tape block which contains data for the second request is located. Therefore the database controller can be optionally programmed to increase a queue time for an active tape volume. By providing a high value for the number of requests which may be queued for an active tape volume this will allow many requests for retrieval of data from a single tape volume to be processed serially. While this will reduce the likelihood of an "archival busy" condition being raised by the system, it will however allow longer queue lengths, which will mean an increase in the average response time for retrieval of data from the database. Therefore a balance is required.

It is envisaged that in accordance with the present invention in order to avoid extended response time during periods of high utilisation that the queue lengths will be limited so that users will be informed that all retrieval resources are currently busy and they should re-submit their request at a later time.

As mentioned above, volumes containing objects whose age falls within a range specified by the database controller may be retained on the tape drive after use while other volumes will be automatically dismounted after all outstanding requests for retrieval from these volumes have been processed. In order to evaluate the benefits of this facility, patterns of access for data recall are examined and identified. If a high proportion of retrievals may be satisfied by a relatively small number of tape cartridge volumes, then those volumes should be retained on drive after all outstanding retrievals have been processed. As mentioned above if patterns of access fall into this category then it is actually more beneficial to maximise the amount of data held per tape, contrary to one of the situations discussed above where most of the tapes are held off-line and those tapes having the highest storage level have the least volume of the tape used. At the same time it is important to appreciate that if all drives are currently occupied with tape cartridges, retrieval of data from non-mounted cartridges will require the mounted cartridge which is least recently referenced to be dismounted.

As this dismount process will need to be completed before the new volume may be mounted, the response time for retrieving the data for the new request will be increased. Thus, too high an instance of this condition will have an adverse affect on general tape data retrieval performance. It is important therefore that the database controller ensures that there isn't an inappropriate specification of tape cartridge volumes to be retained on drive causing excessive "dismount prior to mount" activity. Obviously excessive robot accessor utilisation in an automatic system will have an adverse affect on tape retrieval response time.

It is also envisaged that improved cartridge recording capability hardware facilitating compaction may be used to increase the volume of data which is held per tape cartridge volume.

As mentioned above, objects may be deleted from the database either via explicit delete calls, or via automatic expiration processing. They may be deleted either fully from the database, or may simply be deleted from one tape within the database to be rewritten on another tape.

It will appreciated that tape space for the database which is occupied by deleted objects will then become redundant and as explained above, it is necessary to reclaim redundant space from within the database.

Figure 3:
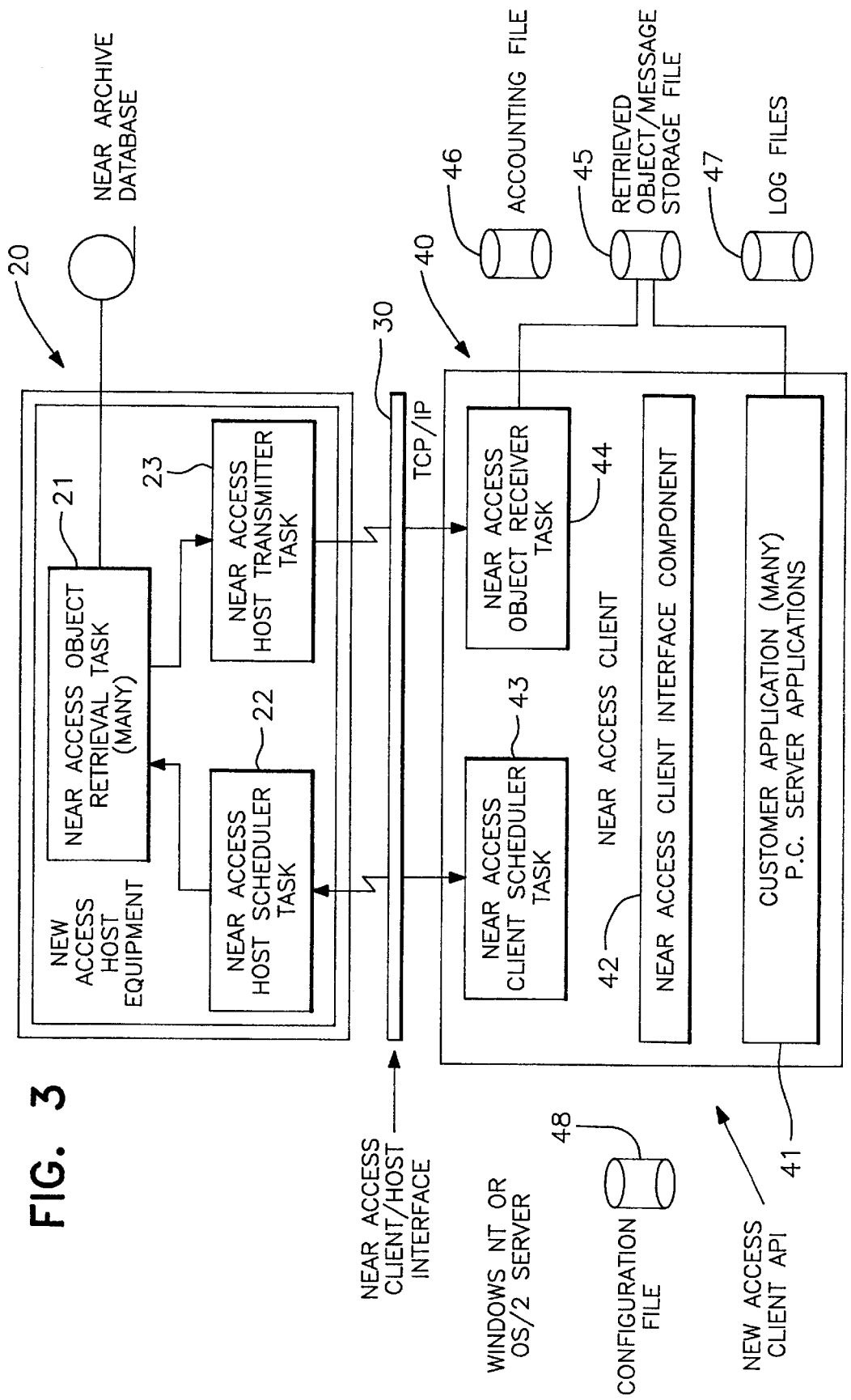
FIG. 3 is a schematic arrangement of a client/host structure.

Referring to FIG. 3 there is illustrated a client/host component structure, where effectively the tape system acts as a host tape system for a client, which client, for example, may be an unconnected party, or may be simply one of the employees or more strictly workstations of the particular company or organisation operating the tape system. The system comprises a data processing system indicated generally by the reference numeral 20, a client host interface 30 and a client data system indicated generally by the reference number 40. The data processing system 20 can be either of the data processing systems 1 or 10 as hereinbefore described, having all the same features as illustrated in FIGS. 1 and 2 and which are identified generally as system control 21. There is also included a host task scheduler 22 and a host task transmitter 23. Both of these are connected to the client interface 30. The client data system 40 comprises a plurality of client input devices 41 which could be, for example, PCs, NTs and the like connected through a client interface 42 to a client task scheduler 43. This client task scheduler 43 is connected through the client host interface 30 with the data processing system 20. An object task receiver 44 is connected between the client interface 42 and the client host interface 30. A received data request storage file 45 is connected between the object task receiver 44 and the client input device 41.

Conventional accounting files 46, log files 47 and configuration files 48 are also provided in suitable devices.

In operation, a client input device 41 sends a request to the client interface 42 which will process the request in whatever is the appropriate manner for further transmission and will also validate the request received from the specific client input device 41. The request will then be transmitted to the client task scheduler 43, where the valid request will be stored in a client request queue on the client task scheduler 43. The request will then be transmitted in whatever manner the client task scheduler 43 decides and is programmed to go to the client host interface 30. The validity of the request in accordance with host acceptance rules will be used to determine whether the request can be accepted or not. Once the request has been accepted as a valid request, it is transmitted to the host task scheduler 22, then it is entered into a database queue within the database controller forming part of the data processing system 20 and thus will be delivered to the system control 21 and after the necessary information has been received in accordance with the process previously described by transmitting read instructions to the tape system controller. The data object will then be sent to the host task transmitter 23 where it will be delivered through the client host interface 30 to the object task receiver 44. From the object task receiver 44 it can either be delivered directly through the client interface 42 and downloaded onto the client input device 41, or alternatively may be delivered to the received data request storage file 45, where it can be stored for retrieval subsequently by the client input device 41.

Once the information has been downloaded from the received data request storage file 45, it is advantageous that the data be deleted immediately therefrom.

It is also envisaged that after a pre-set time, if the information has not been downloaded to the relevant client input device 41, that the data may be deleted.

It is also envisaged that the client task scheduler may contain a queue system which can be used to allocate various levels of urgency to requests received from client input devices 41.

It is also envisaged that the client task scheduler will store a plurality of requests in a batch before transmission through the client host interface 40 the host task scheduler 22.

Similarly it is envisaged that the host task scheduler 22 may be provided with various rules for allocating urgency to requests received from a client.

What is claimed is:

1. A process for the storage and retrieval of data on a tape system including a tape drive with on-line tape storage and off-line retrieval, the process being carried out by a database controller, a data processor and a tape system controller, the process comprising the steps of:

setting up a database structure including a single volume type dataset for a plurality of data objects containing one or more variable length logical records;

creating a hierarchy of storage levels based on perceived levels of activity for data objects written to the database to provide separate specific storage levels;

allocating a tape to a specific storage level;

allocating an appropriate proportion of the storage capacity of that tape for storage of objects at that specific storage level; and setting up an index file for the database comprising a single index control record with tape system initialisation data for each object;

on receiving an object storage request for the system carrying out the steps of:

allocating a storage level to the object;

assigning the object to an appropriate tape for that storage level;

creating a new record header within the tape for that object, the header including a primary key, a storage date and at least storage level information;

writing the object to the tape in sequence after the record header;

entering the record header and associated tape position information on the index file;

over time re-assessing the storage level assigned to the object;

allocating a new storage level to the object as a result of a re-assessment;

altering the record header for the object within the tape and the index file to reflect the new storage level; and having the tape system controller handle the object in the appropriate manner within the tape system for that storage level; and on receiving a data retrieval request carrying out the steps of:

addressing the index files with the primary key and the storage date and accessing the relevant tape and tape position information; and transmitting read instructions to the tape system.

2. A process for the storage and retrieval of data on a tape system as claimed in claim 1 in which at regular time intervals, the following steps are performed of:

scanning all the tapes storing objects allocated a specific storage level;

allocating a different storage level to all objects stored greater than a predetermined length of time at the specific storage level; and performing the required operations on each of the objects allocated the different storage levels as appropriate to that storage levels.

3. A process for the storage and retrieval of data on a tape system as claimed in claim 1 in which the steps are performed of:

recording the level of activity of an object within the database;

at regular time intervals scanning all the tapes storing objects allocated a specific storage level;

allocating a different storage level to all objects stored, whose activity since last scanned fall below a predetermined level of activity; and performing the required operations on each of the objects allocated the different level as is appropriate to that storage level.

4. A process for the storage and retrieval of data on a tape system as claimed in claim 1 in which when a different storage level is allocated to the object the tape system controller carries out the steps of:

re-writing the object to a tape allocated to the new storage level; and deleting the object from the tape storing data at the former level of storage.

5. A process for the storage and retrieval of data on a tape system as claimed in claim 1 in which when the amount of data stored on a tape falls below a pre-set amount for that tape, the steps are performed on the remaining objects stored on the tape of:

rewriting the remaining objects to another tape allocated to that specific storage level for those objects being rewritten;

deleting the objects from the original tape; and releasing the original tape for re-use of the tape system.

6. A process for the storage and retrieval of data on a tape system as claimed in claim 1 in which when an object is allocated the highest level of storage the steps are performed of:

simultaneously writing the object to disk and tape to form a parallel level of storage;

writing disk storage information to the record header and thus on the index file to provide primary access on the disk for the object on receiving a data retrieval request;

storing the tapes off-line; and on allocating a new lower storage level to the object as a result of re-assessment, the steps are performed of:

deleting the data from the disk; and having the tape system controller handle the object and its tape in the appropriate manner within the tape system for that new storage level.

7. A process for the storage and retrieval of data on a tape system as claimed in claim 1 in which when an object is allocated a sufficiently high storage level the tape on which it is written is contained on the system drive and in which the tape is regularly scanned for an object which should be rewritten to a lower level of storage and in which when a lower level of storage is deemed appropriate, there is performed the steps of:

rewriting the object to a tape allocated to the new lower storage level;

deleting the object from the tape contained on the system drive;

scanning the latter tape to determine whether the amount of data falls below the pre-set amount for that tape; and in which if necessary the steps are performed of:

rewriting the remaining objects to a new tape;

inserting that new tape into the tape drive; and releasing the original tape from the tape drive for re-use in the tape system.

8. A process for the storage and retrieval of data on a tape system as claimed in claim 1 in which the steps of:

recording the number of times a request for any object on tape is received requiring its loading on a tape drive;

comparing this to the number of requests for objects on other tapes; and retaining the most frequently accessed tapes on the tape drive.

9. A process for the storage and retrieval of data on a tape system as claimed in claim 1 comprising the steps of:

transmitting the request from a client input device to a client interface to determine the validity of the request and the request is accepted or rejected;

storing a valid request as a client request queue on a client task scheduler;

transmitting requests to a client/host interface to determine the validity of the request in accordance with host acceptance rules and the request is accepted or rejected;

transmitting a valid request to a host task scheduler where a valid request is accepted for processing or rejected;

entering an accepted request into a database queue within the database controller;

taking the request from the database queue;

addressing the index file with the primary key and the storage date and accessing the relevant tape and tape position information;

transmitting read instructions to the tape system controller;

sending the data object to the host task transmitter;

transmitting the requested data object to the client host interface;

transmitting the requested data object to the client input device; and removing the request from the client request queue.

10. A process for the storage and retrieval of data on a tape system including a tape drive with on-line tape storage and off-line retrieval, the process being carried out by a database controller, a data processor and a tape system controller, the process comprising the steps of:

setting up a database structure including a single volume type dataset for a plurality of data objects containing one or more variable length logical records;

creating a hierarchy of storage levels based on perceived levels of activity for data objects written to the database to provide separate specific storage levels;

allocating a tape to a specific storage level;

allocating an appropriate proportion of the storage capacity of that tape for storage of objects at that specific storage level; and setting up an index file for the database comprising a single index control record with tape system initialisation data for each object;

on receiving an object storage request for the system carrying out the steps of:

allocating a storage level to the object;

assigning the object to an appropriate tape for that storage level;

creating a new record header within the tape for that object, the header including a primary key, a storage date and at least storage level information;

writing the object to the tape in sequence after the record header;

entering the record header and associated tape position information on the index file;

over time re-assessing the storage level assigned to the object;

allocating a new storage level to the object as a result of a re-assessment;

altering the record header for the object within the tape and the index file to reflect the new storage level;

having the tape system controller handle the object in the appropriate manner within the tape system for that storage level;

on receiving a data retrieval request carrying out the steps of:

addressing the index files with the primary key and the storage date and accessing the relevant tape and tape position information; and transmitting read instructions to the tape system;

and in which at regular time intervals, the following steps are performed of:

scanning all the tapes storing objects allocated a specific storage level;

allocating a different storage level to all objects stored greater than a predetermined length of time at the specific storage level; and performing the required operations on each of the objects allocated the different storage levels as appropriate to that storage levels.

11. A process for the storage and retrieval of data on a tape system as claimed in claim 10 in which when a different storage level is allocated to the object the tape system controller carries out the steps of:

re-writing the object to a tape allocated to the new storage level; and deleting the object from the tape storing data at the former level of storage.

12. A process for the storage and retrieval of data on a tape system as claimed in claim 10 in which when the amount of data stored on a tape falls below a pre-set amount for that tape, the steps are performed on the remaining objects stored on the tape of:

rewriting the remaining objects to another tape allocated to that specific storage level for those objects being rewritten;

deleting the objects from the original tape; and releasing the original tape for re-use of the tape system.

13. A process for the storage and retrieval of data on a tape system as claimed in claim 10 in which when an object is allocated the highest level of storage the steps are performed of:

simultaneously writing the object to disk and tape to form a parallel level of storage;

writing disk storage information to the record header and thus on the index file to provide primary access on the disk for the object on receiving a data retrieval request;

storing the tapes off-line; and on allocating a new lower storage level to the object as a result of re-assessment, the steps are performed of:

deleting the data from the disk; and having the tape system controller handle the object and its tape in the appropriate manner within the tape system for that new storage level.

14. A process for the storage and retrieval of data on a tape system as claimed in claim 10 in which when an object is allocated a sufficiently high storage level the tape on which it is written is contained on the system drive and in which the tape is regularly scanned for an object which should be rewritten to a lower level of storage and in which when a lower level of storage is deemed appropriate, there is performed the steps of:

rewriting the object to a tape allocated to the new lower storage level;

deleting the object from the tape contained on the system drive;

scanning the latter tape to determine whether the amount of data falls below the pre-set amount for that tape; and in which if necessary the steps are performed of:

rewriting the remaining objects to a new tape;

inserting that new tape into the tape drive; and releasing the original tape from the tape drive for re-use in the tape system.

15. A process for the storage and retrieval of data on a tape system as claimed in claim 10 comprising the steps of:

transmitting the request from a client input device to a client interface to determine the validity of the request and the request is accepted or rejected;

storing a valid request as a client request queue on a client task scheduler;

transmitting requests to a client/host interface to determine the validity of the request in accordance with host acceptance rules and the request is accepted or rejected;

transmitting a valid request to a host task scheduler where a valid request is accepted for processing or rejected;

entering an accepted request into a database queue within the database controller;

taking the request from the database queue;

addressing the index file with the primary key and the storage date and accessing the relevant tape and tape position information;

transmitting read instructions to the tape system controller;

sending the data object to the host task transmitter;

transmitting the requested data object to the client host interface;

transmitting the requested data object to the client input device; and removing the request from the client request queue.

16. A process for the storage and retrieval of data on a tape system including a tape drive with on-line tape storage and off-line retrieval, the process being carried out by a database controller, a data processor and a tape system controller, the process comprising the steps of:

setting up a database structure including a single volume type dataset for a plurality of data objects containing one or more variable length logical records;

creating a hierarchy of storage levels based on perceived levels of activity for data objects written to the database to provide separate specific storage levels;

allocating a tape to a specific storage level;

allocating an appropriate proportion of the storage capacity of that tape for storage of objects at that specific storage level; and setting up an index file for the database comprising a single index control record with tape system initialisation data for each object;

on receiving an object storage request for the system carrying out the steps of:

allocating a storage level to the object;

assigning the object to an appropriate tape for that storage level;

creating a new record header within the tape for that object, the header including a primary key, a storage date and at least storage level information;

writing the object to the tape in sequence after the record header;

entering the record header and associated tape position information on the index file;

over time re-assessing the storage level assigned to the object;

allocating a new storage level to the object as a result of a re-assessment; and in which when an object is allocated the highest level of storage the steps are performed of:

simultaneously writing the object to disk and tape to form a parallel level of storage;

writing disk storage information to the record header and thus on the index file to provide primary access on the disk for the object on receiving a data retrieval request; and storing the tapes off-line;

on allocating a new lower storage level to the object as a result of re-assessment, the steps are performed of:

deleting the data from the disk; and having the tape system controller handle the object and its tape in the appropriate manner within the tape system for that new storage level;

on receiving a data retrieval request carrying out the steps of:

addressing the index files with the primary key and the storage date and accessing the relevant disk or tape and disk or tape position information; and transmitting read instructions to the appropriate system.

17. A process for the storage and retrieval of data on a tape system as claimed in claim 16 in which at regular time intervals, the following steps are performed of:

scanning all the tapes storing objects allocated a specific storage level;

allocating a different storage level to all objects stored greater than a predetermined length of time at the specific storage level; and performing the required operations on each of the objects allocated the different storage levels as appropriate to that storage levels.

18. A process for the storage and retrieval of data on a tape system as claimed in claim 16 in which when a different storage level is allocated to the object the tape system controller carries out the steps of:

re-writing the object to a tape allocated to the new storage level; and deleting the object from the tape storing data at the former level of storage.

19. A process for the storage and retrieval of data on a tape system including a tape drive with on-line tape storage and off-line retrieval, the process being carried out by a database controller, a data processor and a tape system controller and in which the tape system derives as a host tape system a plurality of clients for each through a client host interface the process comprising the steps of:

setting up a database structure including a single volume type dataset for a plurality of data objects containing one or more variable length logical records;

creating a hierarchy of storage levels based on perceived levels of activity for data objects written to the database to provide separate specific storage levels;

allocating a tape to a specific storage level;

allocating an appropriate proportion of the storage capacity of that tape for storage of objects at that specific storage level; and setting up an index file for the database comprising a single index control record with tape system initialisation data for each object;

on receiving an object storage request for the system from a client carrying out the steps of:

allocating a storage level to the object;

assigning the object to an appropriate tape for that storage level;

creating a new record header within the tape for that object, the header including a primary key, a storage date and at least storage level information;

writing the object to the tape in sequence after the record header;

entering the record header and associated tape position information on the index file;

over time re-assessing the storage level assigned to the object;

allocating a new storage level to the object as a result of a re-assessment;

altering the record header for the object within the tape and the index file to reflect the new storage level; and having the tape system controller handle the object in the appropriate manner within the tape system for that storage level; and on a data retrieval request being generated by a client:

transmitting the request from a client input device to a client interface to determine the validity of the request and the request is accepted or rejected;

storing a valid request as a client request queue on a client task scheduler;

transmitting the request to the client/host interface to determine the validity of the request in accordance with host acceptance rules and the request is accepted or rejected;

transmitting a valid request to a host task scheduler where a valid request is accepted for processing or rejected;

entering an accepted request into a database queue within the database controller;

addressing the index file with the primary key and the storage date and the relevant index entry record is accessed to determine the tape and position on the tape where the data object is stored;

transmitting read instructions to the tape system controller;

sending the data object to the host task transmitter;

transmitting the requested data object to the client host interface; and transmitting the requested data object to the client host interface; and the request is removed from the client request queue.

20. A process for the storage and retrieval of data on a tape system as claimed in claim 19 in which the request is sent to the client input device through the client interface.

21. A process for the storage and retrieval of data on a tape system as claimed in claim 19 in which the data request is sent to a received data request storage file under client control for subsequent access.

22. A process for the storage and retrieval of data on a tape system as claimed in claim 19 in which on being downloaded from the request storage file, the data is deleted from the request storage file.

23. A process for servicing data supply requests as claimed in claim 19 in which after a pre-set time the data is deleted from the storage file.

24. A process for servicing data supply requests as claimed in claim 19 in which in the client scheduler, the steps are performed of:

examining the valid request and assigning a priority to the request; and assigning a place in the client request queue depending on the urgency of the request.

25. A process for the storage and retrieval of data on a tape system as claimed in claim 19 in which the client scheduler stores a plurality of valid requests in batches for subsequent transmittal to the host data storage and retrieval system.

* * * * *